United States Patent [19]

Kraft et al.

[11] Patent Number: 6,084,585
[45] Date of Patent: Jul. 4, 2000

[54] SYSTEM FOR DIRECTLY ACCESSING FIELDS ON ELECTRONIC FORMS

[75] Inventors: Reiner Kraft, Gilroy; Qi Lu, San Jose; Ron Yair Pinter, Palo Alto, all of Calif.

[73] Assignee: International Business Machines Corp., Armonk, N.Y.

[21] Appl. No.: 09/124,635

[22] Filed: Jul. 29, 1998

Related U.S. Application Data

[60] Provisional application No. 60/067,675, Dec. 5, 1997.

[51] Int. Cl.[7] .................................................. G06F 3/14
[52] U.S. Cl. ...................... 345/352; 345/353; 345/356; 345/329; 707/507; 707/505
[58] Field of Search ................... 345/352, 353, 345/356, 357, 975, 347, 329; 707/507, 508, 505, 506, 906, 503

[56] References Cited

U.S. PATENT DOCUMENTS

| | | | |
|---|---|---|---|
| 4,763,356 | 8/1988 | Day, Jr. et al. | 707/507 X |
| 5,367,619 | 11/1994 | Dipaolo et al. | 707/506 |
| 5,444,841 | 8/1995 | Glaser et al. | 707/506 |
| 5,450,538 | 9/1995 | Glaser et al. | 707/508 |
| 5,557,723 | 9/1996 | Holt et al. | 707/506 |
| 5,687,385 | 11/1997 | Janay | 707/506 |
| 5,704,029 | 12/1997 | Wright, Jr. | 707/505 |
| 5,920,866 | 7/1999 | Crim | 345/352 X |

Primary Examiner—Raymond J. Bayerl
Attorney, Agent, or Firm—Dan Hubert & Assoc.

[57] ABSTRACT

A computer system provides a graphical user interface (GUI) to assist a user in completing electronic forms. The computer includes components such as a processor, user interface, and video display. Using the video display, the processor presents a row entry template including a menu field and an associated data field. The user completes the menu field by selecting a desired menu entry from a list of predefined menu entries. The user completes the data field by entering data into the data field. This format is especially useful when the data entry provides data categorized by the menu entry, explains the menu entry, or otherwise pertains to the menu entry. Each time the GUI detects activation of a form expand key, it presents an additional row entry template for completion by the user. Upon selection of a submit key, data of the completed form is sent to a predefined destination, such as a linked list, table, database, or another computer. Thus, by planned selection of menu entries, the user can limit his/her completion of an electronic form to blanks applicable to that user, avoiding the others. Nonetheless, the form can be easily expanded row by row to accommodate as many different blanks as the user wishes to complete. The invention may be implemented by a host sending a remote computer machine-executable instructions which the remote computer executes to provide the GUI, where the remote computer ultimately returns the completed form data to the host.

33 Claims, 7 Drawing Sheets

SYSTEM FOR DIRECTLY ACCESSING FIELDS ON ELECTRONIC FORMS

CROSS-REFERENCE TO RELATED APPLICATIONS

This application is a continuation-in-part of Provisional Patent Application No. 60/067,675 filed Dec. 5, 1997, entitled "Direct Access to Fields on Electronic Forms."

BACKGROUND OF THE INVENTION

1. Field of the Invention

The present invention relates generally to the completion of electronic forms. More particularly, the present invention relates to the completion of electronic forms using a flexible and dynamically expandable menu field format, while at the same time improving the efficiency of completing the form by avoiding portions of the form that are not relevant to the information being entered.

2. Description of the Related Art

Prior to the widespread use of computers, data-entry forms were filled out by hand, and were equipped with specific spaces for entering specific information. For instance, a typical expense report form would have spaces for mileage, air travel, lodging, telephone charges, meals, etc. With the incorporation of computers into virtually every aspect of society, it is common to complete these same data-entry forms using a computer. The now-computerized data-entry forms, like their counterparts, often include many different blanks for users to fill out. For any given user, some form blanks may be applicable and others not. Although this is not a particular problem with paper forms, a computer user must pass through or skip over many data-entry fields that do not pertain to them, thereby wasting valuable time scrolling, paging, and otherwise positioning the lengthy form over a limited viewing space.

This is particularly troublesome in environments where the physical size of a user interface is constrained. For example, with portable devices such as hand-held computers with small displays, it is often impossible to visually present an entire form. In this case, a portion of the form is selectively displayed, forcing the user to painstakingly page or scroll through various portions of the form in order to identify the correct location for entering specific information. This exercise can result in omitting information that should be entered into the form, or erroneously entering information. A related problem is that, because the standard forms often have finite length data-entry spaces, the form may force the user to submit incomplete data because there is not enough space to enter particularly large words or phrases.

Consequently, known electronic forms are not completely adequate for some applications due to certain unsolved problems.

SUMMARY OF THE INVENTION

Broadly, the present invention provides users with direct access to data fields on electronic forms, and is practiced on a computer system. This computer system includes a central processing unit (CPU) with access to storage containing a sequence of computer-executable instructions code executable by the CPU to provide a user interface that enables a user to complete data fields on electronic forms. This user interface presents a row (or column) entry template having a menu field, a data field, and a form expand key. The user selects a desired menu entry from a list of available menu entries, and then enters the appropriate data within the data field corresponding to the menu entry selected.

In addition to selecting the menu entry and entering data into the data field to complete the first row entry template, the user may expand the electronic form by selecting the expand form key to add a second row entry template. This second template, like the first, includes a menu field and a data field. The user then selects a menu entry from the list of available menu entries, and enters the appropriate data within the corresponding data field. In this manner, the electronic form may be extended to include as many data entries as necessary, without requiring a long form containing unnecessary blanks.

The present invention includes a number of different aspects including 1) a method of providing direct access to fields on electronic forms; 2) a computer system that provides a user with direct access to those fields on electronic forms; and 3) a storage medium embodying machine-executable instructions that instruct the computer system to provide the user with direct access to those fields on electronic forms.

The present invention provides a number of distinct advantages over the related art. For example, the present invention enables a user to quickly and efficiently complete a form without the need for reviewing or displaying the entire form, although such reviewing is possible. Also, the present invention minimizes the computer display resources needed to display a form because forms are smaller with this invention. Further, the present invention eliminates the user having to review an entire form prior to beginning the task of completing the form, but rather provides a menu from which the user may select the fields of the form where information is to be entered. The ability to flexibly and dynamically expand an electronic form to fit the information to be entered provides for a single form which is presentable on a variety of different platforms, such as desktop workstations, limited function kiosk-like stations, portable or hand-held devices having limited display areas, etc.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION

Figure 1:
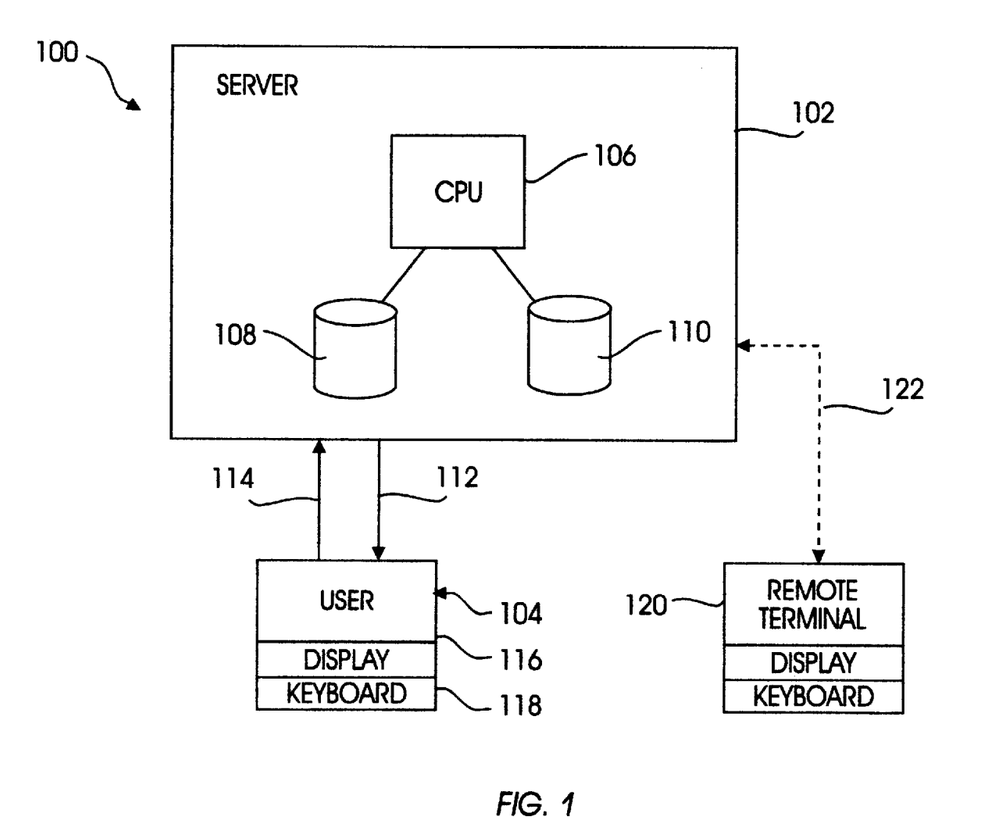
FIG. 1 depicts a diagram of the hardware components of a computer system according to one embodiment of the present invention.

In one exemplary embodiment, the present invention may be implemented in a computer hardware environment as shown in FIG. 1 and generally designated 100. This computer hardware environment 100 includes a host computer 102 and a user interface 104. The host computer 102 may comprise a server, supercomputer, computer workstation, personal computer, or another digital data processing machine suitable for the tasks described below. The host computer 102 includes a central processing unit (CPU) 106 in communication with at least one storage 108–110. In the illustrated example, two storage units are shown, including a non-volatile disk drive storage 108, and a fast-access memory, such as random-access-memory (RAM) 110.

The storage 108–110 may comprise any suitable digital data storage, such as RAID, magnetic tape, optical disk, optical tape, etc. The host computer 102 communicates with a user interface 104 via an input channel 112 and an output channel 114. The channels 112–114 may comprise wires, cables, satellite links, infrared coupling, electromagnetic transmission, fiber optics, etc. Typically, the user interface 104 includes a visual display 116 and a keyboard 118, but it is to be appreciated that virtually any user interface known in the art may be used. For example, other user interfaces may include a push-button mouse, keypad, voice input system, touch-sensitive computer display screen, electronic handwriting instrument such as a stylus, etc.

Figure 10:
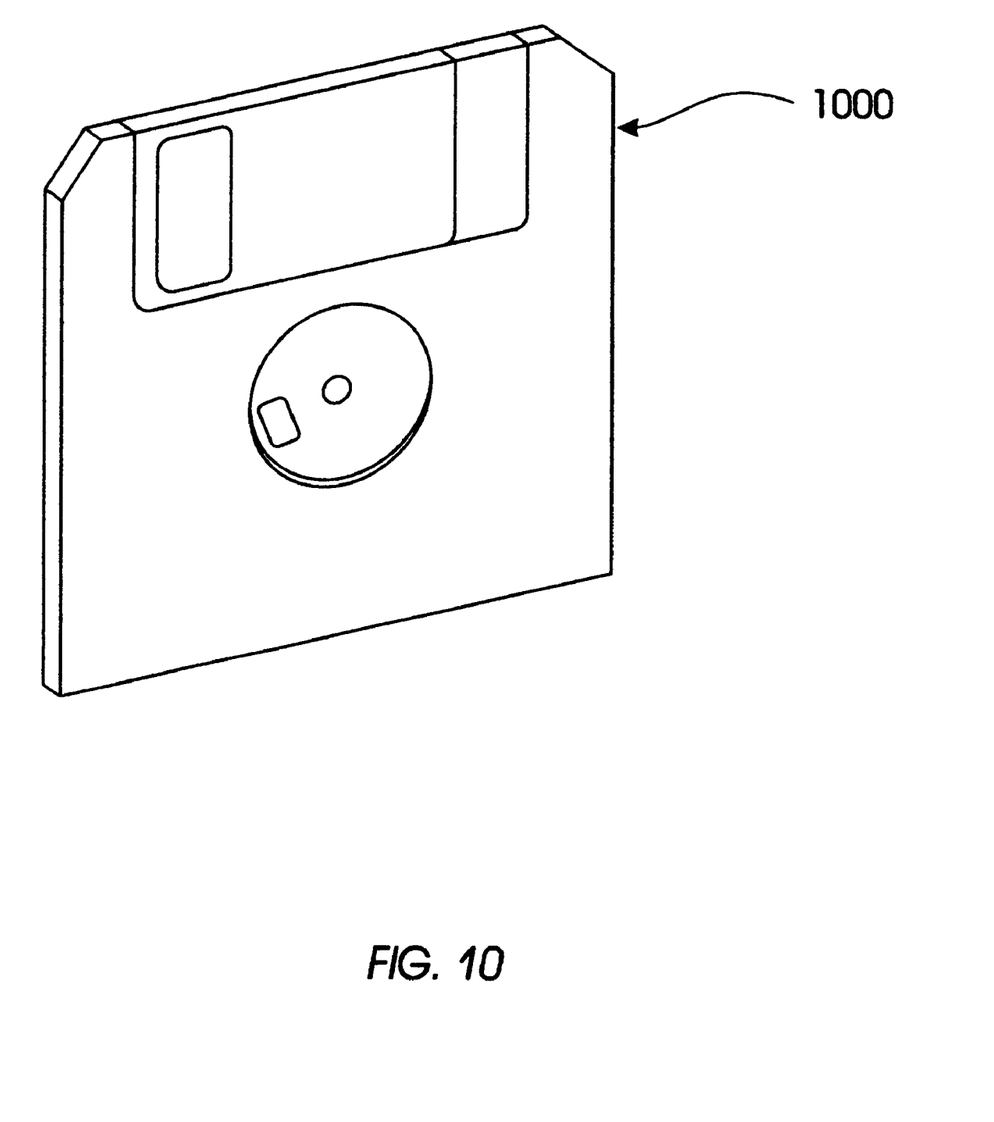
FIG. 10 depicts an illustrative data storage medium in accordance with this invention.

The storage 108 contains a sequence of machine-executable instructions that executable by the CPU 106 to accomplish the method of the present invention. This method will be discussed in more detail below. These instructions may be implemented using virtually any programming language which results in a computer-executable instruction code, such as JAVA, PERL, JAVA Applet, JAVA script, Active Server Program ("ASP"), XML, Pro Script, etc. In addition, it should be understood that virtually any storage may be used to implement the present invention, including for example, paper punch cards, magnetic or optical tape, optical disc, read-only-memory (ROM), erasable programmable read-only-memory (EPROM), etc. Another example is a diskette, as shown by the diskette 1000 of FIG. 10.

Generally, the computer 102 provides a graphical user interface (GUI) at the interface 104, for the user to complete computerized forms. Although the user interface 104 is shown nearby the computer 102, these components may located remotely if desired. Furthermore, although FIG. 1 depicts the computer hardware environment 100 as a single computer, the computer 10 may provide the GUI remotely through one or more additional computers. For example, the present invention may utilize a remote terminal 120, comprising a personal computer, workstation, mainframe, supercomputer, or other suitable digital data processing machine. The terminal 120 may be physically remote from the computer 102, or nearby, depending upon the application.

The terminal 120 is coupled to the computer 102 by a link 122, such as fiber optics, satellite link, cables or wires, intelligent computer channel, telephone lines, the Internet, an intranet, a local or wide area network, or any suitable digital communications medium. The terminal 120 includes one or more user interfaces, such as a display and keyboard as illustrated. In the remote terminal embodiment, the computer 102 transmits machine-executable code to the terminal 120, which is executed at the terminal 120 to provide the improved electronic form GUI of the invention at the remote user interface. Using input obtained with the GUI, the terminal 120 may "submit" the data by storing it locally and/or transmitting the data back to the host 102.

OPERATION

Figure 2:
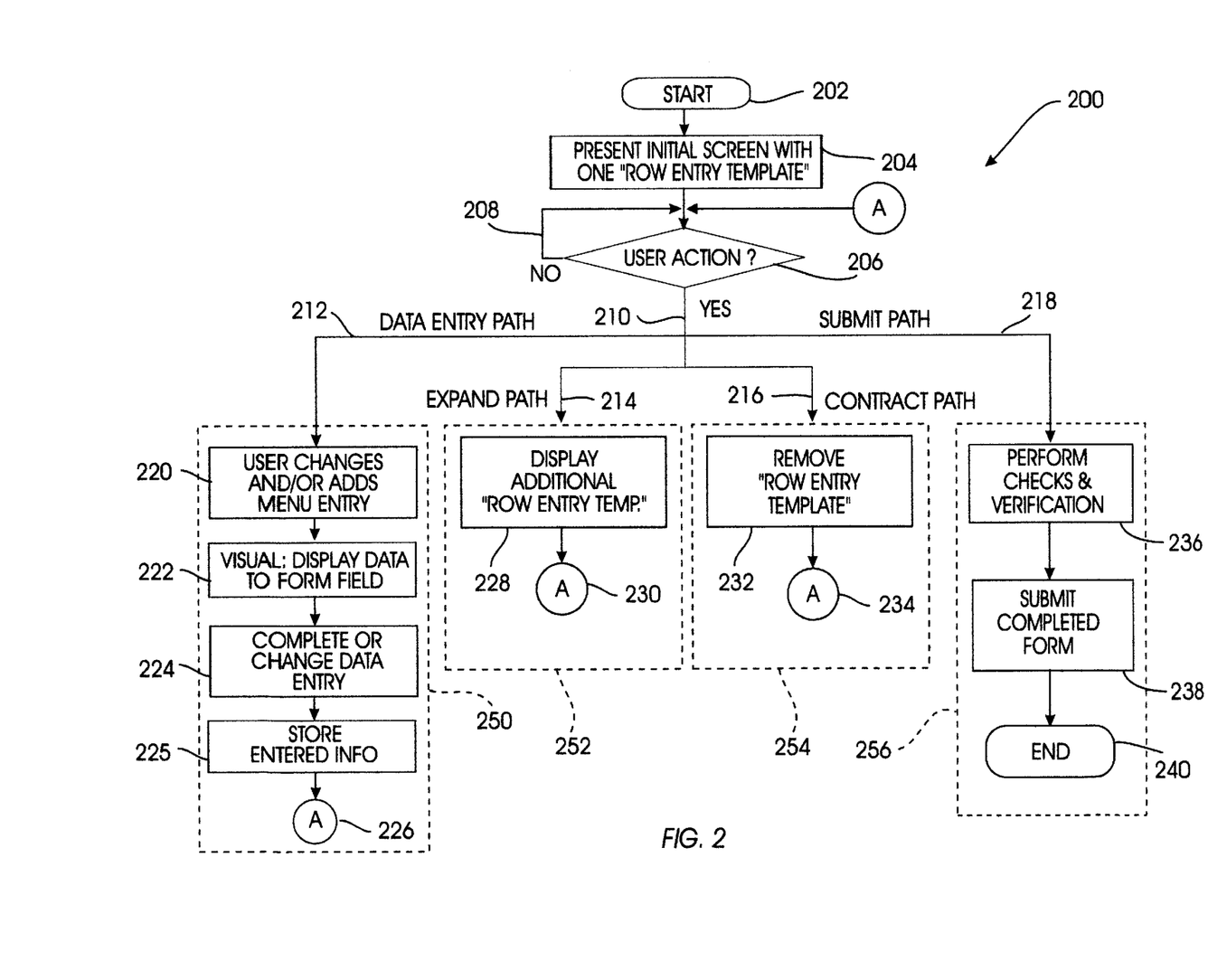
FIG. 2 depicts a flowchart illustrating the sequence of steps for implementing an exemplary method of the present invention.

Referring now to FIG. 2, an exemplary sequence of the present invention is shown and generally designated 200. Sequence 200 depicts an exemplary series of method steps which are performed to provide the user with direct access to fields on electronic forms.

In one embodiment, the host 102 transmits machine-executable code to the terminal 120, and the terminal remotely executes the code to locally perform the sequence 200. An example of this embodiment may exist when the terminal 120 and host 102 are coupled via Internet link (122), where the user operates the terminal 120 to visit a worldwide web site provided by the host 102. While interacting with the host's web site, the terminal 120 opts to complete an electronic form, this option being made by menu selection, hyperlink, mouse-clicking an icon, etc. In response, the host 102 transmits the machine-executable code to the terminal 120 for local execution. The machine-executable code may comprise source code, executable binary code, JAVA Applet, ACTIVE-X program, or another format suitable to the application.

In another embodiment, the sequence 200 may be performed directly by the CPU 106, which accepts, processes, and responds to user input from the interface 104 or terminal 120. In this embodiment, the sequence 200 comprises an application program running on the host 102, which directly obtains information from the user. For ease of explanation, without any limitation intended, the following description is discussed in the context of this embodiment.

Initial Screen

After the sequence 200 begins in step 202, step 204 presents an initial screen to the user, including a "row entry template". A row entry template comprises two or more associated information fields that may be completed by a user entering data into the information fields. In this example, the row entry template includes a menu field and a data field.

The menu field is pre-programmed with a number of menu entries, according to the type of form being completed. The user may choose a menu entry user from the menu field by operating the interface 104 to activate a suitable menu field viewer, such as a pull-down menu, scrolling menu, expanding window displaying all menu entries, etc. If the form is an expense report, some exemplary menu entries may comprise mileage, parking fees, air travel, hotel/lodging, telephone, tips, laundry, and a generic category for data which does not belong in the listed menu entries.

The data field is associated with the menu field, and is initially presented blank and ready to receive input from the user. However, the data field may be pre-programmed with standard or common input data. Input from the user is generally received by the user typing the appropriate information into the keyboard, however, any other user interface device may be used, such as a mouse being used to select pre-programmed information. Although the example of an expense report is used herein, the present invention may be used with any number of applications, such as constructing a query for an Internet search engine, completing a software registration form, constructing a spreadsheet, or any other application requiring the completion of an electronic form.

User Action

Step 206 monitors the user interface 104 for action by the user. If no user action is detected, return path 208 returns control to step 206. User action includes the selection of the menu field, entering information on the keyboard, or any other activation of the user interface by the user. Once user action is detected, path 210 passes the sequence to one of four possible paths, namely, data entry path 212, expand form path 214, contract form path 216, or submit form path 218. Data entry path 212 leads to data entry sequence 250, expand form path 214 leads to expand form sequence 252, contract form path 216 leads to contract sequence 254, and submit path 218 leads to submit sequence 256.

Data Entry Sequence

The data entry path 212 is used if the user action detected in step 206 was the selection of a menu field or entry of data into the data field. In step 220 the user accesses the menu field and selects one or more of the menu entries corresponding to the information the user wishes to enter. This information is displayed to the user in step 222, which may occur concurrently with step 220. As mentioned above, access to the menu field is accomplished by the user activating the keyboard or mouse to select one menu entry from the menu field for entry into the row entry template. In the example discussed herein, the menu field is provided by a pull-down menu. However, other interfaces may be used, such as a scrollable menu, "radio" buttons selected by a mouse-clicking in a circular area next to an explanatory legend, "checkable" lists where legend entries are listed next to mouse-clickable boxes that are darkened or x-ed when selected, etc. In step 224, the user accesses the data field within the row entry template and enter data therein. Access to the data field may be accomplished by the users manipulation of the keyboard or mouse to position a cursor at the beginning of the data field. Step 224 may occur previously to steps 220–222, if desired.

In a form where the menu entry selected was "mileage", the data entry may represent the total number of miles, such as "1,800 MILES." The user may manipulate the keyboard of the user interface to enter any data into the data field, but a mouse may be used in systems where a pre-programmed list of data is provided for the user's selection, or use a stylus with handwriting recognition software, etc.

In step 225, the contents of the completed row entry template are temporarily stored. This storage may be made, for example, to storage 108–110 of the host 102. In the case of the terminal 120, the form contents may be temporarily stored, for example, in local memory of the terminal 120. Storage of the row entry template may be accomplished by storing the entire form including the menu fields, data fields, or the user's entries alone may be stored. For example, the user's entries may be stored in a variety of data structures, such as a relational database, linked list, etc. Following the selection of the menu entry, the entering information into the data field, and the storing of that information, the sequence 250 returns to step 206 via step 226.

The sequence 250 may also be performed to correct or modify information previously entered into the menu field or data field, where the user accesses the particular field and supplements, replaces, or otherwise corrects the information using the user interface.

Expand Sequence

As an alternative to data entry path 212, expand form path 214 is used if the user action detected in step 206 was the selection of a "form expand key". The path 214 leads to an expand sequence 252, which adds a new row entry template to the initial row entry template and any further row entry templates that are being displayed. For example, once, the above "mileage" menu field was completed with "1,800 MILES", selection of the expand form sequence 214 adds a second row entry template to the form. The expand form sequence 214 is triggered when the user activates the user interface appropriately, such as by pressing an "expand" key on the keyboard, or clicking on an "expand" icon with a mouse, for example. Once the new row entry template is displayed, the sequence returns to step 206 to wait for further instruction from the user.

Once a second row entry template is added, the user may choose to complete the newly added row entry template, thereby selecting the data entry path 212. In this second row entry template, the user might select an alternative menu entry, such as "Hotel/Lodging." Having selected the desired menu entry, the user may then proceed to enter the pertinent data, such as the costs of the hotel/lodging, such as "$225.00", or could simply indicate the hotel or lodge where the user stayed, such as "Treasure Island."

Contract Sequence

If the user action detected in step 206 was the selection of the contract key, contract path 216 is selected and leads to contract sequence 254 which removes the row entry template indicated by the user, as shown in step 232. Contract sequence 254 is implemented by the user by activation of the user interface, such as by pressing a "contract" key on the keyboard, or clicking on a "contract" icon with a mouse, for example. In an exemplary embodiment, each row entry template is associated with one contract key, which serves to contract that template. Thus, when the "contract" icon or key is pressed, the associated row entry template is removed from the screen, the data contained within the data field is deleted from storage, and the sequence returns to the step 206.

The data entry path 212, expand path 214, and contract path 216 may be executed any number of times, depending on the amount of information the user needs to input or change in the form. For example, if the user had a business trip involving stays at two different hotels, the user may incorporate two row entry templates into the form, with each row entry template being completed for each separate hotel visit.

Paths May Be Invoked In Any Order

The particular order of invoking the paths 212–216 described above, namely, the selection of data entry path 212, followed by the expand path 214 and contact path 216 is merely exemplary, and may occur in different order. For example, the user may opt to expand the form to include several row entry templates prior to selecting any menu fields, or entering any data into the corresponding data fields. Additionally, it is possible for the user to expand the form to include a number of row entry templates, select a menu entry for each of the row entry templates, and then complete the data fields. Also, the user may contract the form by eliminating a single row entry template at any time during the selection of menu entries or the entering of data.

Submit Sequence

If the user action detected in step 206 was the selection of a "submit" key, the submit form path 218 is invoked, leading to a submit form sequence 256. The submit form sequence 256 includes step 236 which provides several functions, including the invocation of a variety of data checking procedures to ensure that the data in each of the data fields is proper to correspond to the menu field selected. For example, these data checking procedures may verify that a data entry corresponding to a mileage menu field is a number, or that a data entry corresponding to a Hotel/

Lodging menu field consists of alphanumeric characters. If there is any data within the data field which does not conform to such data checking procedures, an error message may be generated, and the user prompted to make corrections. During this period, the user may also review the completed form and correct any errors or omissions. Additionally, step 236 may confirm that certain fields, pre-programmed as being "mandatory", are completed. Mandatory fields, for example, may include fields which must be completed regardless of the length of the completed form, such as the user's name, dates of travel, etc.

If all data within the data fields passes the verification step 236, step 238 transmits the completed form, comprising the contents of the menu fields and the data fields, to a pre-defined destination. This transmission may involve sending the completed form as graphically represented, the underlying data in table or linked list form, or another representation. In the case of the user interface, transmission is directed at the computer 102 via the channel 114. With the remote terminal 120, transmission may be directed at the computer 102 and/or storage local to the terminal 120. For instance, if the link 122 or channels 112/114 comprise an Internet connection to a worldwide web site running on the computer 102, the transmission of step 238 may involve the terminal 120 or interface 104 returning data back to the computer 102. Alternatively, the terminal 120 may submit forms by storing them on storage (e.g., hard drive) at the terminal 120 in other cases, such as personal expense accounting for example.

Detailed Operation

The operation of the present invention will be more fully discussed in terms of the completion of an expense report, which will serve as the example throughout the remainder of this disclosure. An expense report is particularly useful because such known expense reports are frequently left incomplete because a number of fields are inapplicable to the traveler's particular trip. For instance, on one business trip, the traveler may only use hotel and car rental expenses, while on the next trip, the traveler may have incurred airfare and cab fare. If the traveler uses a paper form or a known electronic form, this same form must be used for both trips, resulting in many blank fields for each trip. In such circumstances, the user would save time by entering only the pertinent information into the form, while ignoring those remaining categories of expenses. The process of providing direct access to fields on electronic forms, as mentioned above, is described in greater detail below by combining exemplary displays shown in FIGS. 3–9 with the sequence 200 shown in FIG. 2.

Initialization with Single Row Entry Template

Figure 3:
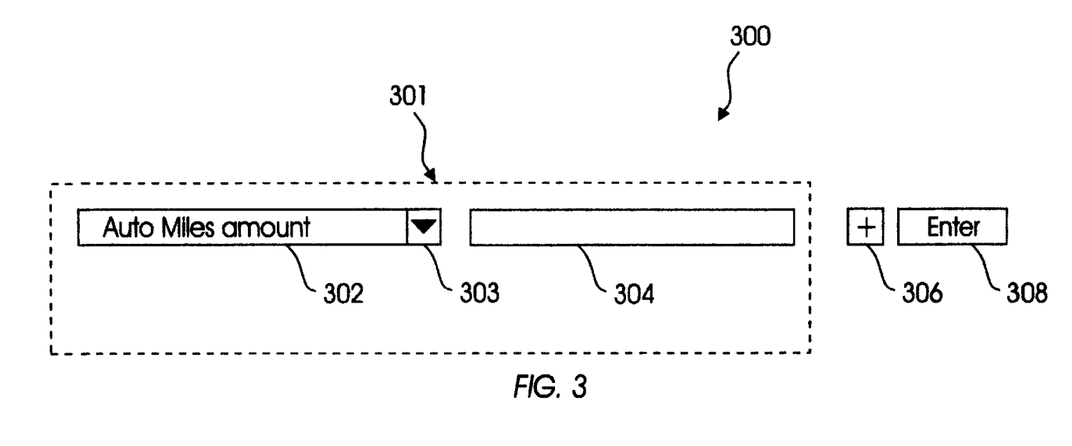
FIG. 3 depicts a single row entry template showing a completed menu field.

Referring now to FIG. 3, a display within user interface 104 is shown and generally designated 300. Display 300, created in step 204, includes a user-friendly GUI comprising a row entry template 301 which includes a menu field 302, a menu expand key 303, and a data field 304. Additionally, the display 300 includes a form expand key 306, and an enter key 308 (also called a "submit" key).

In a preferred embodiment, the GUI may list menu entries within the menu field in their order of priority, alphabetically, or in their order of likelihood of occurrence. Additionally, the GUI may list categories of information to be entered, as well as attributes of the information and keywords related to the menu field. Such listings may be implemented by presenting a list of information categories within a pull-down menu accessible by the user, a scrolling list, etc.

Data Entry

Figure 4:
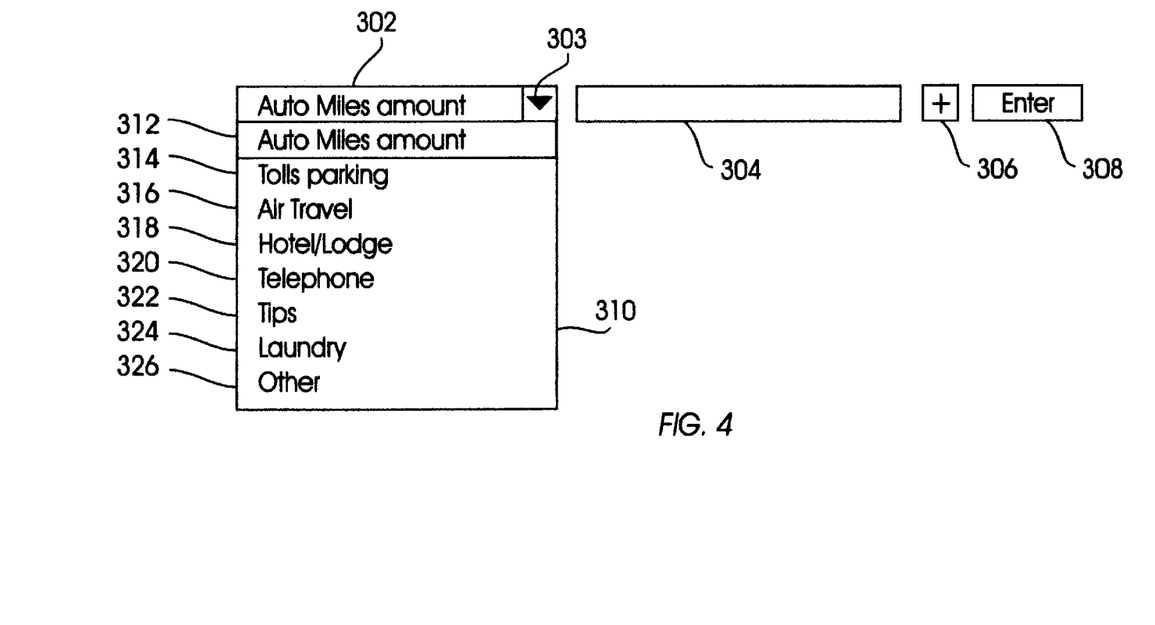
FIG. 4 depicts the row entry template of FIG. 3, having a pull-down selection to complete the menu field.

Referring to FIG. 4, when the user may selects the menu expand key 303 (step 206), a pull-down menu table 310 appears, displaying a number of pre-programmed menu entries. For instance, menu table 310 includes the following menu entries: "auto miles amount" entry 312; a "tolls parking" entry 314; an "air travel" entry 316; a "hotel/lodge" entry 318; a "telephone" entry 320; a "tips" entry 322; a "laundry" entry 324; and a generic "other" entry 326. The menu entries within the menu table are merely exemplary, and that any variety of menu entries may be placed within the menu table.

Once the user selects the menu expand key 303, data entry path 212 is selected invoking data entry sequence 250, and a menu entry from the menu table 310 may be selected and displayed in steps 220, 222. This selection is made by selecting "auto miles amount" menu entry 312 using a mouse or other pointing device known in the art. Selection of the menu entry 312 places the selected menu entry into menu field 302, thus completing the menu field 302.

Figure 5:
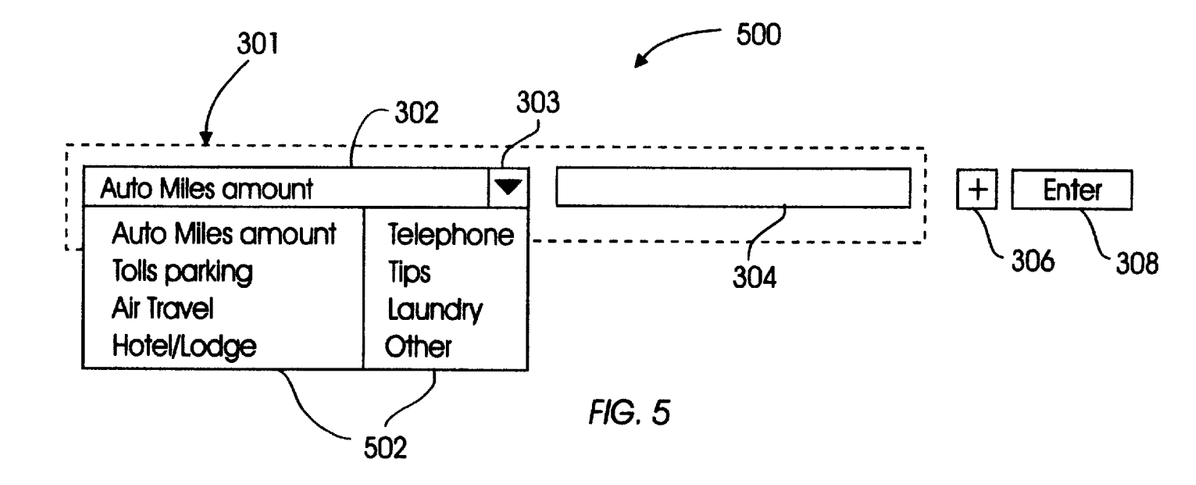
FIG. 5 depicts a row entry template having an alternative format for the pull-down selection shown in FIG. 4.

Referring to FIG. 5, an alternative embodiment of a display is shown and generally designated 500. Display 500 includes a row entry template 301 which includes a menu field 302, a menu expand key 303 and a data field 304, and a form expand key 306, and an enter key 308. The menu table 502, however, is provided in a two column format. While functionally similar to menu table 310 shown in FIG. 4, menu table 502 provides for a higher density presentation of menu entries, which would be particularly useful in implementations using platforms having limited display areas. Any method of presenting menu field entries is fully contemplated herein, such as a listing of all menu selections available, with each entry being equipped with a "radio button" or check-box for identification of a particular menu entry.

Figure 6:
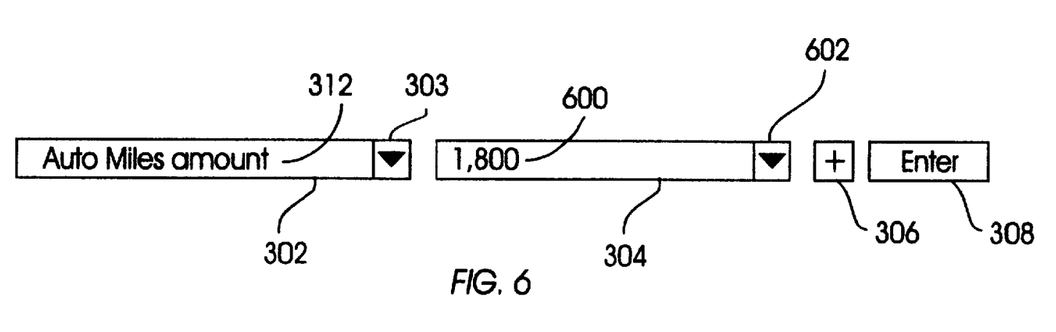
FIG. 6 depicts a row entry template having a completed menu field and a completed data field.

In step 224 of data entry sequence 250, data may be entered into the data field, as shown in FIG. 6. For example, data field 304 is completed with a numerical entry 600 of "1,800" such that the row entry template is now completed showing an "auto miles amount" of "1,800." Entering of any necessary data is accomplished using a keyboard, for example.

In cases with a history of expense reporting using a particular menu field entry, the data field associated with the menu field may be automatically completed with the most recent entry. For instance, if the user completing the expense report has previously selected a "auto miles amount", and at that time had entered a data field value, the present invention may automatically enter the previously entered data field value in an attempt to minimize the time required to complete the form. Alternatively, the present invention may provide a listing of previously-entered data field values, thus allowing the user to select the appropriate data entry, or simply enter a new data field information. For example, this may be accomplished by providing a data entry display button 602, which when activated by the user, provides a table listing of the previously entered data entries, and a user may select one of the data entries presented. In the event the pre-entered data field information is not correct, the user may simply modify or overwrite such entry with the corrected information using the user interface. Additionally, in the event that information entered into a data field, or the menu field selected is incorrect, the user may simply edit that data within the data field or the menu field selected to the correction information. Once the information has been entered by the user in steps 220, 222, and 224, the information is then stored in memory in step 225.

Expansion

A second row entry template may be added by selecting the form expand key 306, thereby adding row entry template 700 (FIG. 7) in step 228 of the expand form sequence 252. Row entry template 700 is similar to the template 301, and includes a menu field 702 having a menu expand key 704, and a data field 706.

Figure 7:
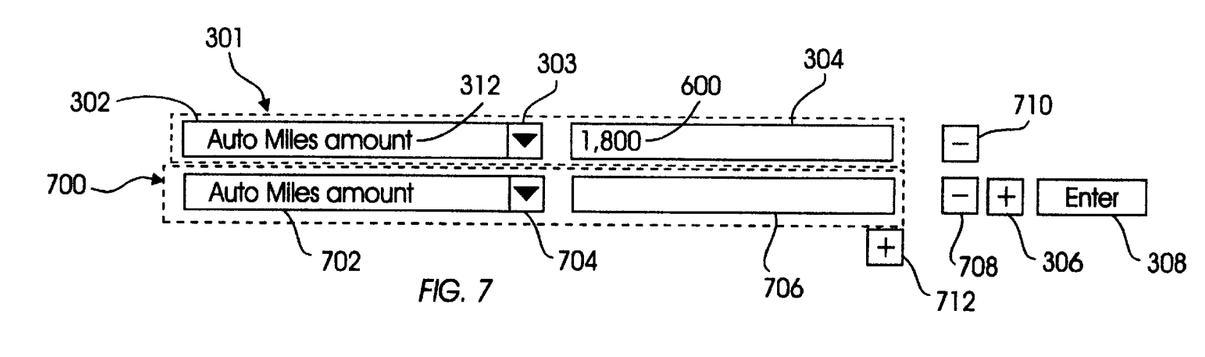
FIG. 7 depicts the row entry template shown in FIG. 6, with a second row entry template.

In addition to adding row entry templates, a user may add extra data fields to be associated with a single menu field. For example, if a user has more than one data entry for a single menu field entry, the row entry template may be extended to include one or more additional data fields. This may be accomplished by providing a data field expand key 712 associated with a data field which, upon selection by the user, provides one or more additional data fields. As an alternative, the existing data field may be enlarged. In this manner, it is not necessary to have more than one occurrence of a particular menu field, as repeating menu entries may be replaced by a single menu field with multiple data entries.

The ability to dynamically and flexibly expand an electronic form is of particular importance to the present invention as it allows a user to simply complete the necessary entries into a form without having to skip over or leave blank any unnecessary fields. Consequently, an electronic form completed in this interactive manner is only as long as it needs to be to convey the necessary information, thereby conserving valuable system resources and user interface area.

Figure 8:
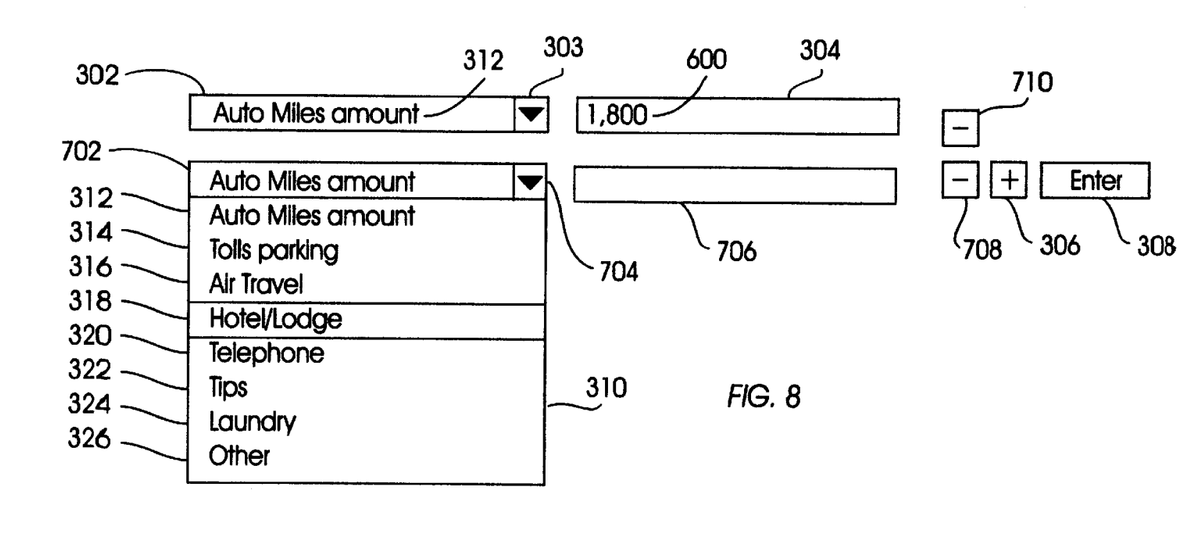
FIG. 8 depicts the row entry template shown in FIG. 7, with the second row entry template having a pull-down selection to complete the menu field.

Referring now to FIG. 8, once the row entry template 700 has been added in the expand form sequence 252, the sequence 200 returns to step 206, and the user may select the menu expand key 704 to display the menu table 310. Both FIGS. 4 and 8 have shown identical menu tables 310, however, it is to be understood that the menu table may be modified to account for menu entries previously selected. For instance, since the menu entry selected in row entry table 301 was "auto miles amount" entry 312, it may be more efficient to remove that menu entry from the menu table, or to otherwise visually distinguish previously selected menu entries from other menu entries within the menu table, such as by highlighting, or using color. This is particularly so in instances where it is not possible to have more than one entry in a form having the same menu field, such as on business travels of only a single destination.

Figure 9:
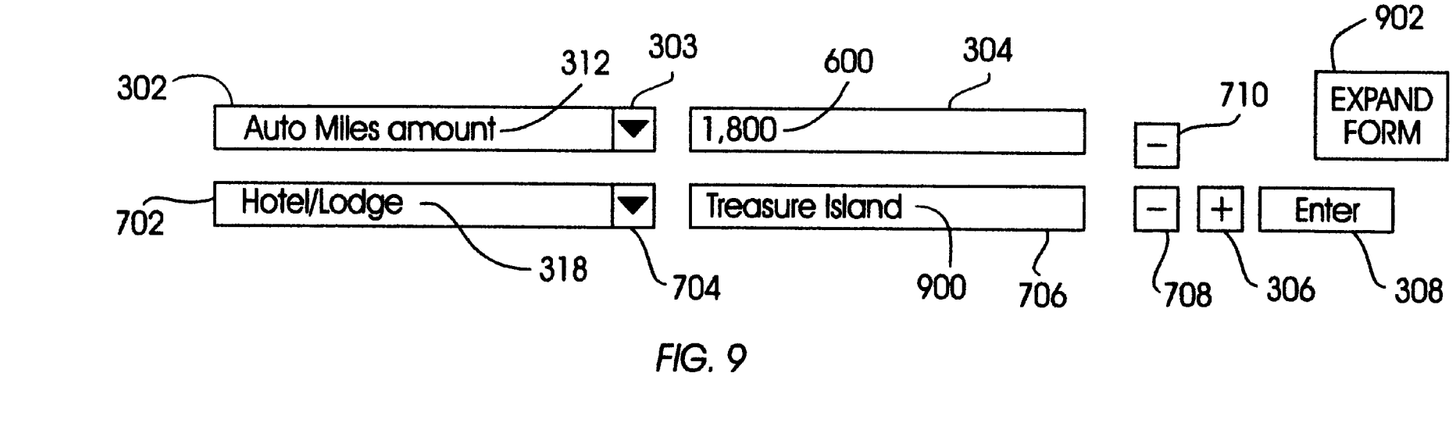
FIG. 9 depicts the row entry templates of FIG. 8, with the menu fields and data fields completed.

FIG. 8 shows the user selection of "hotel/lodge" menu entry 318, which is shown entered in menu field 702 in FIG. 9. Once the appropriate menu field entry is selected, the user then inputs the appropriate data into data field 706, such as the name of the hotel or lodge where the user stayed. In this case, the user has entered "Treasure Island" data 900 in the data field 706. Of course, the order of completing the fields 702, 706 may be reversed if desired.

When the user is unfamiliar with a form and would like to have the entire form displayed, with one row entry template for each entry within the menu table, the user may select all of the entries within the menu table simultaneously. This may be accomplished by the user interface, such as the mouse, to highlight all the menu entries at the same time. This will result in a form being created with a menu field for each menu table entry, thereby allowing the user to simply enter all information within the form without having to dynamically specify the menu fields to be used. This would be particularly useful in situations where substantially the entire form will be completed, and would allow the user to delete those few menu fields which are not used.

Contract

Once a form has been expanded to include more than one row entry template, a contract key, such as keys 708 and 710, is displayed enabling the user to delete the associated row entry field. For example, if following the creation of row entry template 700 the user wishes to delete row entry template 301, the user may select contract key 710 in step 206 thereby selecting contract path 216, and row entry template 301 will be removed from the form in step 232 contract form sequence 254. Similarly, if the user wishes to delete row entry template 700, the user may select contract key 708. Prior to the deletion of the row entry template, the present invention may prompt the user in order to insure that it is truly the intent of the user to delete that particular template, and provide an escape if such deletion is not intended.

Submission

Following completion of the data-entering process into the menu fields and data fields, the completed form including those fields may be submitted by invoking the submit form sequence 256. For example, submission of the entire completed form, or only the menu entries and corresponding data entries, includes the transmission of the information from storage of the remote terminal 120, to the computer 102 (FIG. 1). Alternatively, submission of the entire completed form, or only the menu entries and corresponding data entries may include a transmission between programs operating within the same computer 102. Typically, submission is achieved by the user pressing the "enter" button 308 which invokes the verification steps outlined above. These verification steps may include verification that sufficient menu fields and data fields are completed in order to represent a completed form. Additionally, the verification step may also include steps to insure that mandatory menu and data fields have been completed, such as the users name, address, dates of travel, and the like.

Prior to submission, the user may view the entire form as entered by selecting the expand form button 902 which displays the entire form consisting of a form having a row entry template for each menu entry. This option may be activated at any time during the form completion process, and the user may return to the shortened form showing only completed row entry templates by selecting the expand form button 902 a second time. In other words, each selection of the expand form button 902 toggles the display between the entire form and the shortened form.

If all verification steps are completed and the completed form is in appropriate condition for submission, the form is then submitted to the program intended to receive the form. For instance, in the expense report example, the intended program may be an accounting program for reimbursement of travel expenses, which receives the completed form, calculates reimbursement values, and generates a reimbursement check to the user. As an alternative to transmission of the entire form, only the user-entered data may be transmitted to the intended program to minimize the length of the transmission and the amount of information to be transmitted.

OTHER EMBODIMENTS

While there have been shown what are presently considered to be preferred embodiments of the invention, it will be apparent to those skilled in the art that various changes and modifications can be made herein without departing from the scope and spirit of the invention as defined by the appended claims and their equivalents. Furthermore, although elements of the invention may be described and/or claimed in the singular, the plural is also contemplated unless limitation to the singular is expressly stated.

What is claimed is:

1. A computer-driven method of providing a user interface to gather data to complete a form, the method comprising:

displaying on a video display a row entry template including at least one menu field and a data field corresponding to each menu field, where contents of each menu field comprise one user-selected menu entry from a predefined group of such menu entries and each menu entry comprises a representation that a different class of information resides in the corresponding data field;

displaying a form expand selector and a submit selector on the video display;

receiving a user entry to the menu field comprising user selection of one of the predefined menu entries;

receiving a user entry to the data field comprising data entered into the data field;

detecting user activation of the form expand selector, and displaying an additional row entry template on the video display for each user activation of the expand selector; and receiving user entry to the submit selector, and in response, transmitting the user entries in a machine-readable format to a predefined destination.

2. The method of claim 1, where each row entry template further includes a corresponding contract key, the method further comprising:

determining whether the contract key is selected, and if so, deleting the corresponding row entry template from the video display.

3. The method of claim 1, where:

the method is performed by a first computer having a digital data storage; and the predefined destination is the storage.

4. The method of claim 1, the method further comprising determining whether the user entry to the data field exhibits a predefined format appropriate to user-selected contents of the corresponding menu field, and if not, prompting the user to make another entry.

5. The method of claim 1, the method further comprising displaying a data expand selector associated with each data field, and in response to user selection of a data expand selector, expanding the associated data field on the video display.

6. The method of claim 1, where the displaying of each menu field comprises at least one of the following:

providing a pull-down menu, providing a scrollable menu, providing radio buttons, and providing a checkable list.

7. A computer-driven method of completing electronic forms, comprising:

a host computer transmitting machine-readable code to a second computer, the code tangibly embodying a program of instructions executable by the second computer to perform a method of providing a user interface to gather data to complete a form, the method comprising:

displaying on a video display a row entry template including at least one menu field and a data field corresponding to each menu field, where contents of each menu field comprise one user-selected menu entry from a predefined group of such menu entries, and each menu entry comprises a representation that a different class of information resides in the corresponding data field;

displaying a form expand selector and a submit selector on the video display;

receiving a user entry to the menu field comprising user selection of one of the predefined menu entries;

receiving a user entry to the data field comprising data entered into the data field;

detecting user activation of the form expand selector, and displaying an additional row entry template on the video display for each user activation of the expand selector; and receiving user entry to the submit selector, and in response, transmitting the user entries in a machine-readable format to the host computer; and the host computer receiving the user entries transmitted from the second computer.

8. The method of claim 7, where each row entry template further includes a corresponding contract key, the method further comprising:

determining whether the contract key is selected, and if so, deleting the corresponding row entry template from the video display.

9. The method of claim 7, the method further comprising determining whether the user entry to the data field exhibits a predefined format appropriate to user-selected contents of the corresponding menu field, and if not, prompting the user to make another entry.

10. The method of claim 7, the method further comprising displaying a data expand selector associated with each data field, and in response to user selection of a data expand selector, expanding the associated data field on the video display.

11. The method of claim 7, where the displaying of each menu field comprises at least one of the following:

providing a pull-down menu, providing a scrollable menu, providing radio buttons, and providing a checkable list.

12. An article of manufacture comprising a signal-bearing medium tangibly embodying a program of machine-readable instructions executable by a digital data processing apparatus to perform a method of providing a user interface to gather data to complete a form, the method comprising:

displaying on a video display a row entry template including at least one menu field and a data field corresponding to each menu field, where contents of each menu field comprise one user-selected menu entry from a predefined group of such menu entries, and each menu entry comprises a representation that a different class of information resides in the corresponding data field;

displaying a form expand selector and a submit selector on the video display;

receiving a user entry to the menu field comprising user selection of one of the predefined menu entries;

receiving a user entry to the data field comprising data entered into the data field;

detecting user activation of the form expand selector, and displaying an additional row entry template on the video display for each user activation of the expand selector; and receiving user entry to the submit selector, and in response, transmitting the user entries in a machine-readable format to a predefined destination.

13. The medium of claim 12, where each row entry template further includes a corresponding contract key, the method further comprising:

determining whether the contract key is selected, and if so, deleting the corresponding row entry template from the video display.

14. The medium of claim 12, where:

the method is performed by a first computer having a digital data storage; and the predefined destination is the storage.

15. The medium of claim 12, the method further comprising determining whether the user entry to the data field exhibits a predefined format appropriate to user-selected contents of the corresponding menu field, and if not, prompting the user to make another entry.

16. The medium of claim 12, the method further comprising displaying a data expand selector associated with each data field, and in response to user selection of a data expand selector, expanding the associated data field on the video display.

17. The medium of claim 12, where the displaying of each menu field comprises at least one of the following:

providing a pull-down menu, providing a scrollable menu, providing radio buttons, and providing a checkable list.

18. An article of manufacture comprising a signal-bearing medium tangibly embodying a program of machine-executable instructions executable by a digital data processing apparatus to perform a method of completing electronic forms, the method comprising:

a host computer transmitting machine-readable code to a second computer, the code tangibly embodying a program of instructions executable by the second computer to perform a method of providing a user interface to gather data to complete a form, the method comprising:

displaying on a video display a row entry template including at least one menu field and a data field corresponding to each menu field, where contents of each menu field comprise one user-selected menu entry from a predefined group of such menu entries, and each menu entry comprises a representation that a different class of information resides in the corresponding data field;

displaying a form expand selector and a submit selector on the video display;

receiving a user entry to the menu field comprising user selection of one of the predefined menu entries;

receiving a user entry to the data field comprising data entered into the data field;

detecting user activation of the form expand selector, and displaying an additional row entry template on the video display for each user activation of the expand selector; and receiving user entry to the submit selector, and in response, transmitting the user entries in a machine-readable format to the host computer; and the host computer receiving the user entries transmitted from the second computer.

19. The medium of claim 18, where each row entry template further includes a corresponding contract key, the method further comprising:

determining whether the contract key is selected, and if so, deleting the corresponding row entry template from the video display.

20. The medium of claim 18, the method further comprising determining whether the user entry to the data field exhibits a predefined format appropriate to user-selected contents of the corresponding menu field, and if not, prompting the user to make another entry.

21. The medium of claim 18, the method further comprising displaying a data expand selector associated with each data field, and in response to user selection of a data expand selector, expanding the associated data field on the video display.

22. The medium of claim 18, where the displaying of each menu field comprises at least one of the following:

providing a pull-down menu, providing a scrollable menu, providing radio buttons, and providing a checkable list.

23. A data gathering system, comprising:

a digital data storage;

a video display;

one or more user input devices;

a digital data processor coupled to the video display, storage, and user input devices, the processor being programmed to provide a graphical user interface to gather data to complete a form by:

displaying on the video display a row entry template including at least one menu field and a data field corresponding to each menu field, where contents of each menu field comprise one user-selected menu entry from a predefined group of such menu entries, and each menu entry comprises a representation that a different class of information resides in the corresponding data field;

displaying a form expand selector and a submit selector on the video display;

receiving a user entry to the menu field comprising user selection of one of the predefined menu entries;

receiving a user entry to the data field comprising data entered into the data field;

detecting user activation of the form expand selector, and displaying an additional row entry template on the video display for each user activation of the expand selector; and receiving user entry to the submit selector, and in response, transmitting the user entries in a machine-readable format to a predefined destination.

24. The system of claim 23, where each row entry template further includes a corresponding contract key, the method further comprising:

determining whether the contract key is selected, and if so, deleting the corresponding row entry template from the video display.

25. The system of claim 23, where:

the method is performed by a first computer having a digital data storage; and the predefined destination is the storage.

26. The system of claim 23, the method further comprising determining whether the user entry to the data field exhibits a predefined format appropriate to user-selected contents of the corresponding menu field, and if not, prompting the user to make another entry.

27. The system of claim 23, the method further comprising displaying a data expand selector associated with each data field, and in response to user selection of a data expand selector, expanding the associated data field on the video display.

28. The system of claim 23, where the displaying of each menu field comprises at least one of the following:

providing a pull-down menu, providing a scrollable menu, providing radio buttons, and providing a checkable list.

29. A data gathering system, comprising:

a digital data storage; and a host digital data processor coupled to the storage and being programmed to remotely provide a user interface via a second computer to gather data to complete one or more fields of a group of predefined fields by:

the host processor transmitting machine-readable code to a second computer, the code tangibly embodying a program of instructions executable by the second computer to perform a method of providing a user interface to gather data to complete a form, the method comprising:

displaying on a video display a row entry template including at least one menu field and a data field corresponding to each menu field, where contents of each menu field comprise one user-selected menu entry from a predefined group of such menu entries, and each menu entry comprises a representation that a different class of information resides in the corresponding data field;

displaying a form expand selector and a submit selector on the video display;

receiving a user entry to the menu field comprising user selection of one of the predefined menu entries;

receiving a user entry to the data field comprising data entered into the data field;

detecting user activation of the form expand selector, and displaying an additional row entry template on the video display for each user activation of the expand selector; and receiving user entry to the submit selector, and in response, transmitting the user entries in a machine-readable format to the host computer; and the host processor receiving the user entries from the second computer.

30. The system of claim 29, where each row entry template further includes a corresponding contract key, the method further comprising:

determining whether the contract key is selected, and if so, deleting the corresponding row entry template from the video display.

31. The system of claim 29, the method further comprising determining whether the user entry to the data field exhibits a predefined format appropriate to user-selected contents of the corresponding menu field, and if not, prompting the user to make another entry.

32. The system of claim 29, the method further comprising displaying a data expand selector associated with each data field, and in response to user selection of a data expand selector, expanding the associated data field on the video display.

33. The system of claim 29, where the displaying of each menu field comprises at least one of the following:

providing a pull-down menu, providing a scrollable menu, providing radio buttons, and providing a checkable list.

* * * * *